United States Patent [19]

Tasky et al.

[11] Patent Number: 5,442,550
[45] Date of Patent: Aug. 15, 1995

[54] METHOD OF DIAGNOSING A PARK/NEUTRAL SWITCH FOR VEHICULAR AUTOMATIC TRANSMISSION

[75] Inventors: Thomas R. Tasky, Auburn Hills; Samuel Campbell, III, Southfield; James L. Vincent, Troy; Mark A. Simonich, Highland, all of Mich.

[73] Assignee: Chrysler Corporation, Highland Park, Mich.

[21] Appl. No.: 238,099

[22] Filed: May 4, 1994

[51] Int. Cl.$^6$ ............... B60K 28/10; B60K 41/04
[52] U.S. Cl. ............... 364/424.1; 364/424.03; 364/431.11; 307/139
[58] Field of Search ........... 364/424.1, 424.03, 426.04, 364/431.1, 431.11, 480, 481, 551.01, 431.04, 184; 307/10.6, 139, 140; 371/68.1, 68.2, 68.3

[56] References Cited

U.S. PATENT DOCUMENTS

| | | | |
|---|---|---|---|
| 4,237,833 | 12/1980 | Des Lauriers | 123/320 |
| 4,363,249 | 12/1982 | Stugart | 74/850 |
| 4,364,343 | 12/1982 | Malik | 123/179 B |
| 4,829,439 | 5/1989 | Otobe | 364/431.04 |
| 4,856,613 | 8/1989 | Reginold | 180/282 |
| 4,896,267 | 1/1990 | Frantz et al. | 364/426.04 |
| 4,960,092 | 10/1990 | Sasaki et al. | 123/414 |
| 4,965,735 | 10/1990 | Holbrook et al. | 364/424.1 |
| 4,998,450 | 3/1991 | Nogle | 74/850 |
| 5,178,042 | 1/1993 | Moroto et al. | 364/424.1 |
| 5,182,710 | 1/1993 | Tomisawa | 364/424.1 |

*Primary Examiner*—Kevin J. Teska
*Assistant Examiner*—Tan Nguyen
*Attorney, Agent, or Firm*—Mark P. Calcaterra

[57] ABSTRACT

The status of a Park/Neutral (P/N) switch for an automatic transmission in an automotive vehicle is diagnosed by a method which includes the steps of determining whether an engine of the automotive vehicle is cranking, diagnosing the P/N switch for a P/N state of the automatic transmission when the engine is cranking, and diagnosing the P/N switch for a Drive state of the automatic transmission when the engine is not cranking.

18 Claims, 4 Drawing Sheets

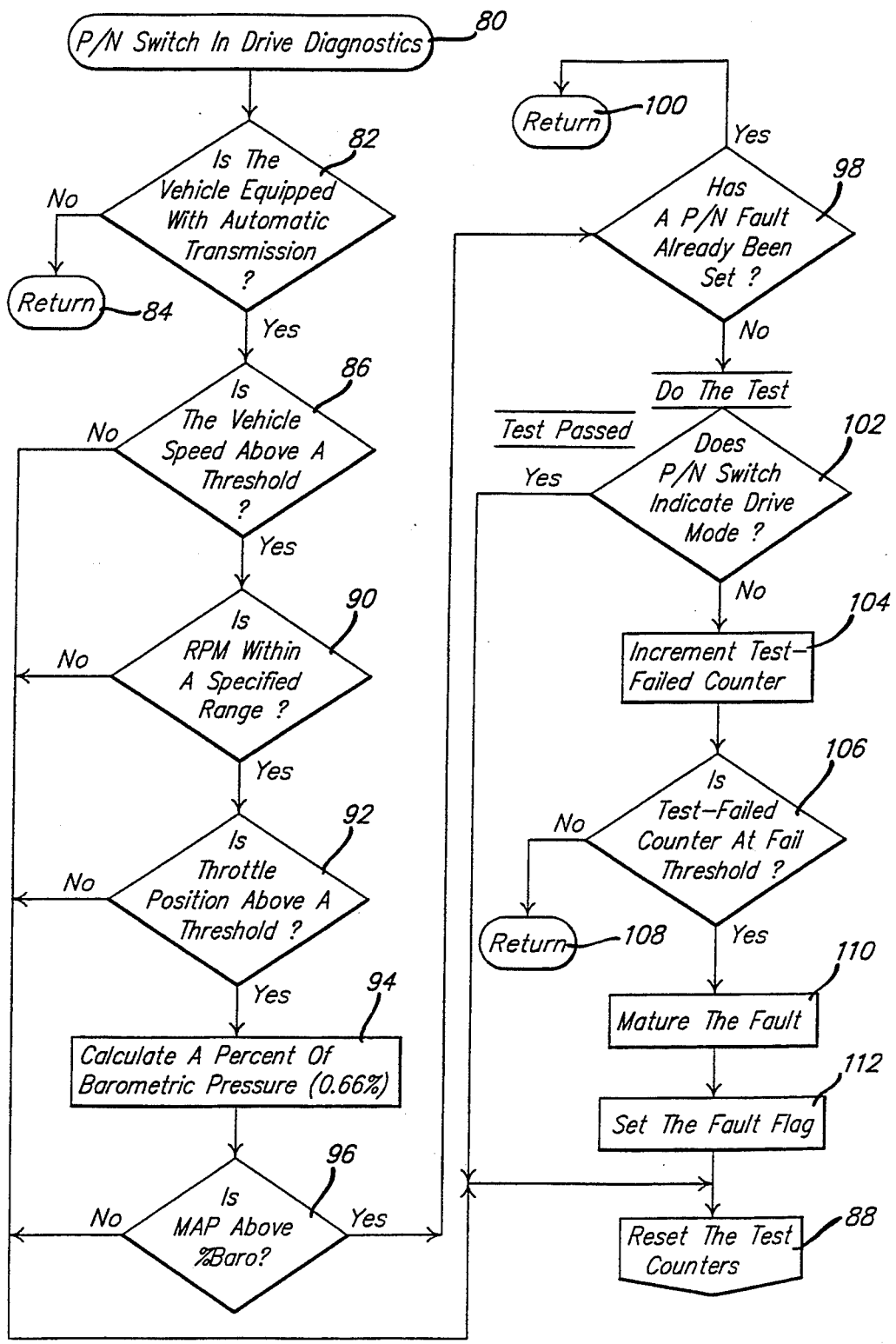

METHOD OF DIAGNOSING A PARK/NEUTRAL SWITCH FOR VEHICULAR AUTOMATIC TRANSMISSION

BACKGROUND OF THE INVENTION

1. Field of the Invention

The present invention relates generally to automatic transmissions and, more particularly, to a method of diagnosing a Park/Neutral switch for an automatic transmission.

2. Description of the Related Art

Automotive vehicles are commonly provided with an automatic transmission. The automatic transmission typically includes a Park/Neutral (P/N) switch to indicate whether the automatic transmission is in a Park or Neutral state. Generally, the P/N switch is used to communicate the state of the automatic transmission to a controller for an Automatic Idle Speed (AIS) system of an internal combustion engine in the automotive vehicle. The controller needs this information in order to determine a target idle speed for the engine. If the engine is not loaded, which is the case when the automatic transmission is in the Park or Neutral State, the controller uses a low target idle speed. This low target idle speed is maintained as long as the engine operating conditions are constant. When the automatic transmission is taken out of either the Park or Neutral state, the load on the engine is enough to disturb its idle condition. In that case, the target idle speed is increased and the controller uses a high target idle speed.

One disadvantage of the above automatic transmission is that when the P/N switch fails, communication between the automatic transmission and controller is cut off. As a result, the controller will not be able to meet the engine load requirements for the idle speed. If the low target idle speed is used, the engine may stall when the automatic transmission engages. On the other hand, if the high target idle speed is used, the engine RPM may be unnecessarily high. Since the controller has no other means of detecting an increased engine load due to a change of state in the automatic transmission, dynamic selection of an appropriate idle speed will be hindered and the exhaust emissions may be higher than when the AIS system is dynamically controlled.

SUMMARY OF THE INVENTION

It is, therefore, one object of the present invention to provide a method of diagnosing a Park/Neutral switch for an automatic transmission.

It is another object of the present invention to provide a method of diagnosing a Park/Neutral switch for an automatic transmission when the transmission is in a Park or Neutral state and when the transmission, is in a Drive state.

To achieve the foregoing objects, the present invention is a method of diagnosing a Park/Neutral (P/N) switch for an automatic transmission in an automotive vehicle. The method includes the steps of determining whether an engine of the automotive vehicle is cranking, diagnosing the P/N switch for a P/N state if the engine is cranking, and diagnosing the P/N switch for a Drive state if the engine is not cranking.

One advantage of the present invention is that a method is provided of diagnosing a Park/Neutral for an automatic transmission. Another advantage of the present invention is that the method of diagnosing a Park/Neutral switch allows interaction with the controller for the AIS system. Yet another advantage of the present invention is that the P/N switch is diagnosed for either a short or open circuit. Still another advantage of the present invention is that when the automatic transmission is expected to be in either a Park, Neutral or Drive state, the method examines the state of the P/N switch to make sure it agrees with the correct mode of the transmission operation.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 4 is a flowchart of an in Drive diagnostics for a method of diagnosing a Park/Neutral switch according to the present invention.

DESCRIPTION OF THE PREFERRED EMBODIMENT(S)

Figure 1:
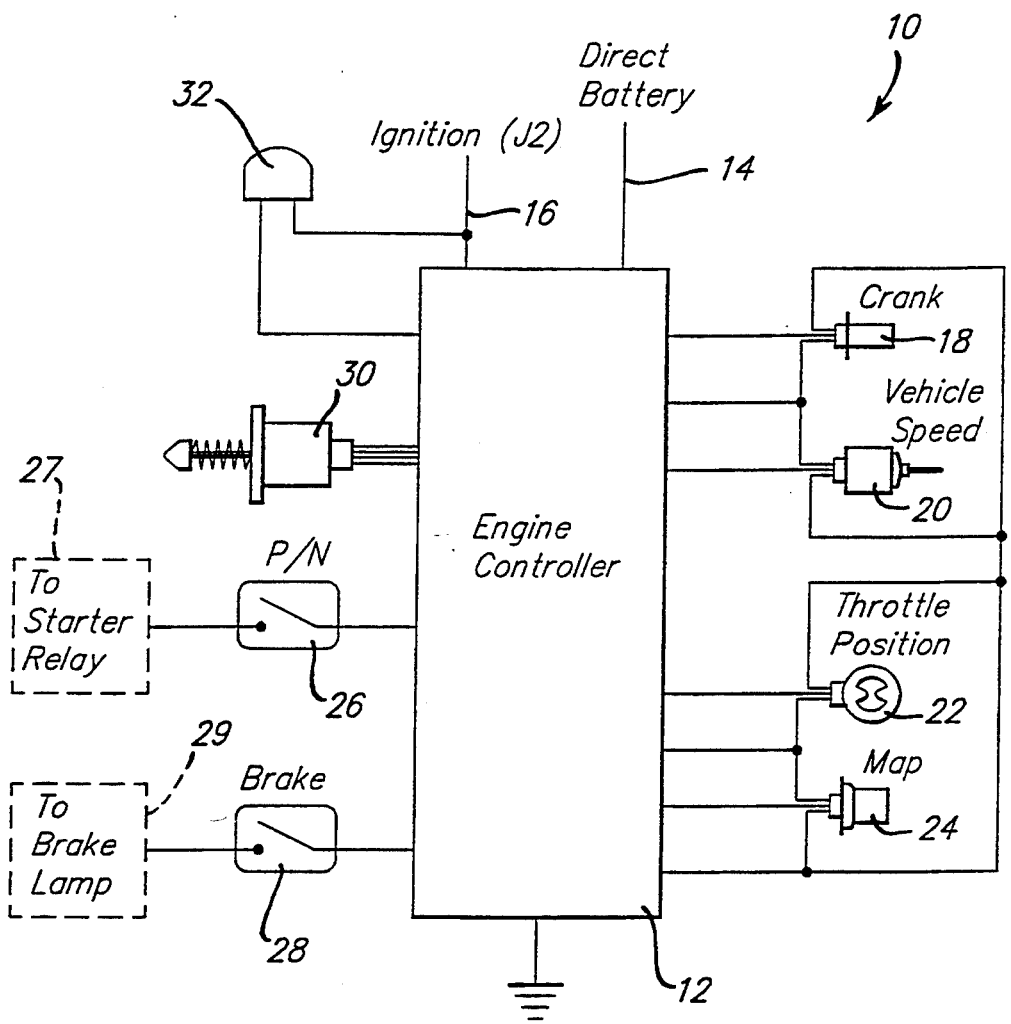
FIG. 1 is a schematic diagram of a system used to carry out a method of diagnosing a Park/Neutral switch according to the present invention.

Referring to FIG. 1, a system 10 is shown for carrying out a method of diagnosing a Park/Neutral switch for an automatic transmission (not shown) in an automotive vehicle (not shown). The system 10 includes a powertrain control module or engine controller 12 receiving power inputs 14 and 16 from a vehicle battery (not shown) and ignition of an internal combustion engine (not shown) for the vehicle. It should be appreciated that the engine controller 12 is conventional and known in the art.

The system 10 also includes a crank sensor 18 for sensing a speed of the engine and a vehicle speed sensor 20 for sensing a speed of the vehicle. The system 10 includes a throttle position sensor 22 for sensing an angular position of a throttle (not shown) of the engine and a manifold absolute pressure (MAP) sensor 24 for sensing MAP of the engine. The sensors 18, 20, 22 and 24 are connected to the engine controller 12 which receives their inputs. It should be appreciated that the sensors 18, 20, 22 and 24 are conventional and known in the art.

The system 10 further includes a Park/Neutral switch 26 interconnecting a starter relay 27 of the engine and the engine controller 12 for sensing whether the transmission is in a Park or Neutral state. The system 10 includes a brake switch 28 interconnecting a brake lamp 29 of the vehicle and the engine controller 12 for sensing whether brakes (not shown) of the vehicle are being applied. The system 10 also includes an Automatic Idle Speed (AIS) motor 30 connected to a throttle body (not shown) of the engine and the engine controller 12 for controlling the amount of idle air pass the throttle in the throttle body of the engine. The system 10 includes a malfunction indicator lamp 32 connected to the power input 16 and the engine controller 12 to notify a vehicle operator of a malfunction of the system 10. It should be appreciated that the AIS motor 30 is of the stepper type and is conventional and known in the art.

Figure 2:
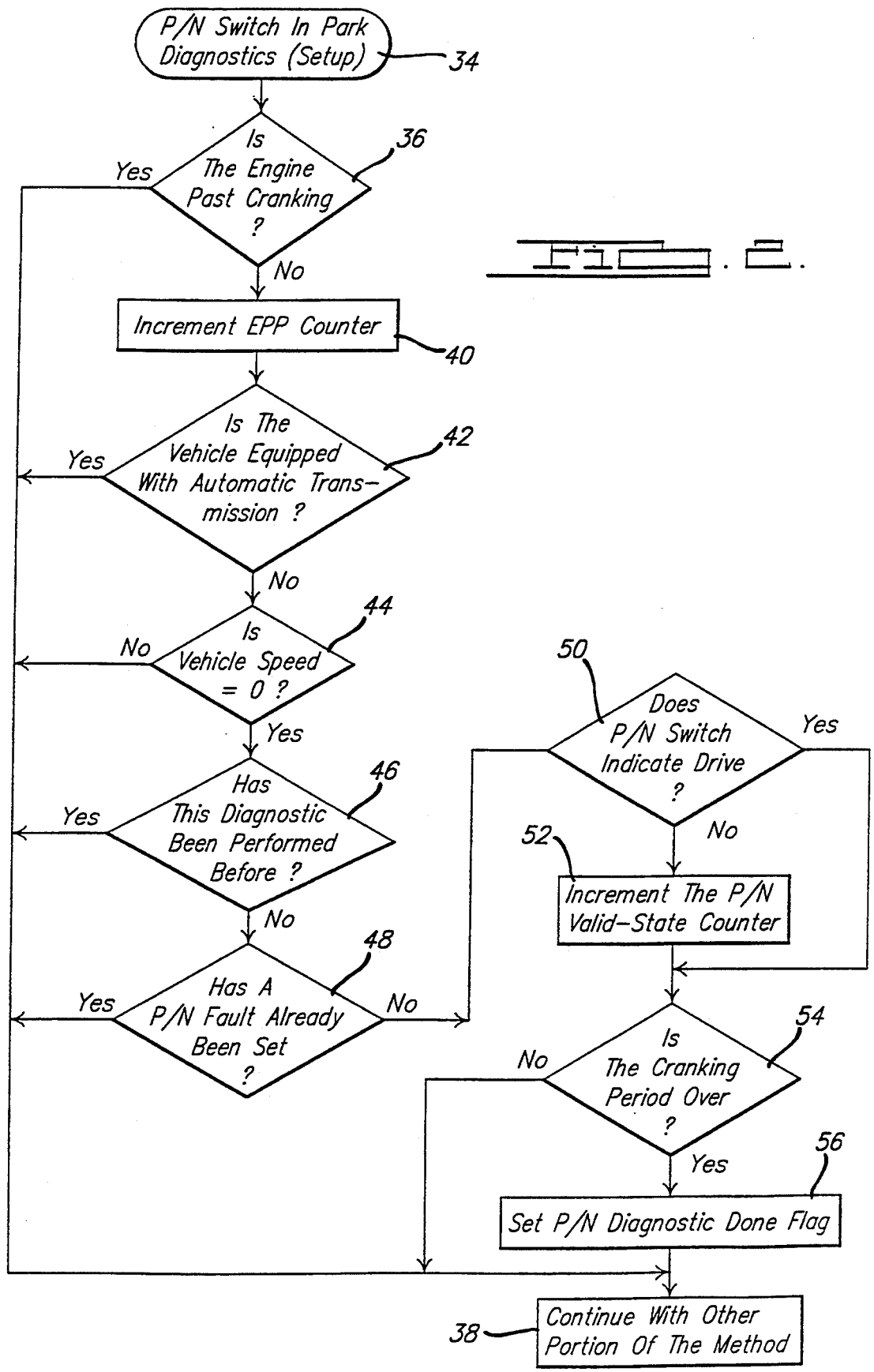
FIG. 2 is a flowchart of a setup portion of in Park diagnostics for a method of diagnosing a Park/Neutral switch according to the present invention.
Figure 3:
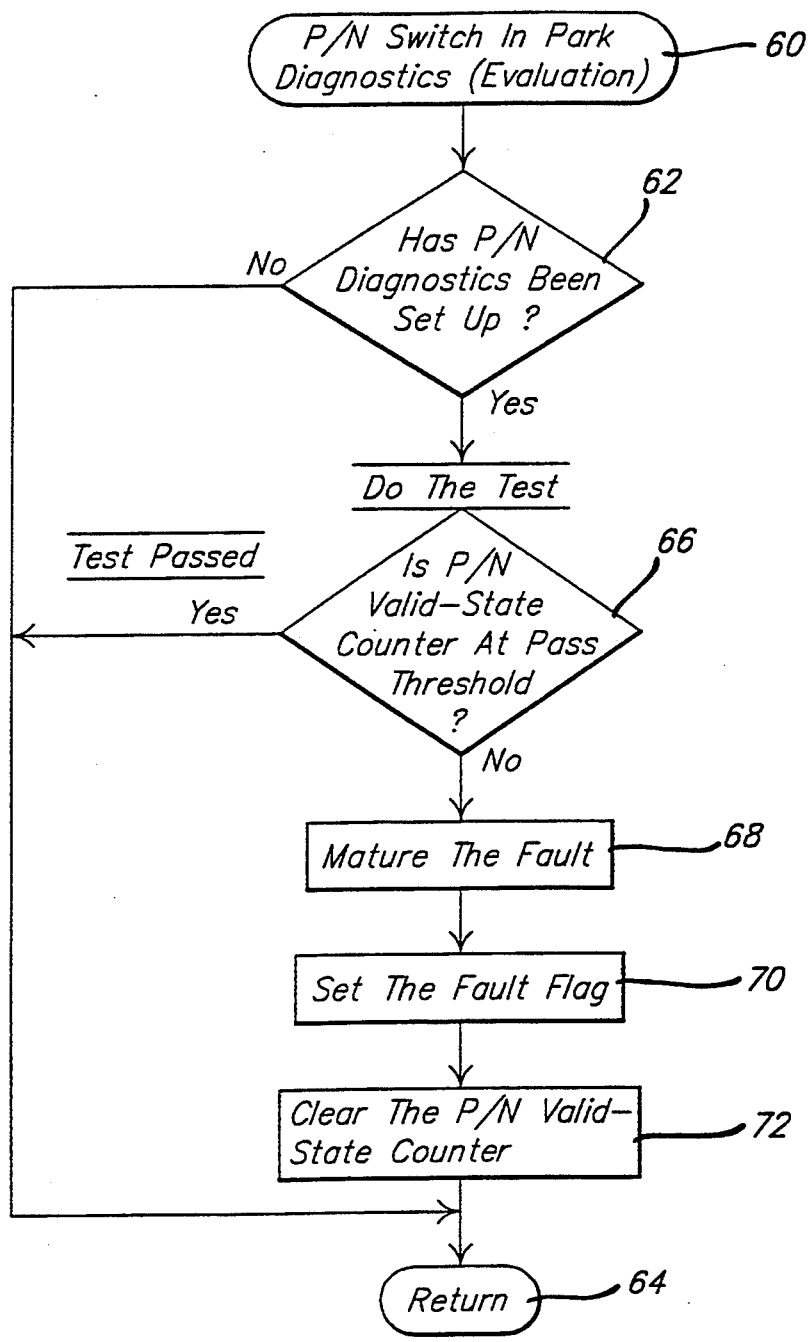
FIG. 3 is a flowchart of an evaluation portion of in Park diagnostics for a method of diagnosing a Park/Neutral switch according to the present invention.

Referring to FIGS. 2 through 4, a method of diagnosing the P/N switch 26 is shown. The method diagnoses the P/N switch 26 for a short or open when the automatic transmission is in a Park or Neutral state and when the automatic transmission is in a Drive state. In FIG. 2, a flowchart illustrates the methodology for a diagnostic setup portion for the method of diagnosing the P/N switch 26 when the automatic transmission is in a Park or Neutral state. The methodology begins in bubble 34 and advances to diamond 36. In diamond 36, the methodology determines whether the engine is past cranking, for example, by looking for a P/N Diagnostic Done flag to be described. If so, the methodology advances to block 38 and continues with other portions of the method. If not, the methodology advances to block 40 and increments an Engine Pick-up Pulse (EPP) counter (not shown) of the engine controller 12 by a predetermined value such as one (1). The methodology then advances to diamond 42 and determines whether the vehicle is equipped with an automatic transmission, for example, by looking for a flag. If not, the methodology advances to block 38 previously described.

In diamond 42, if the vehicle is equipped with an automatic transmission, the methodology advances to diamond 44 and determines whether the vehicle speed is equal to a predetermined value such as zero (0). The engine controller 12 compares the vehicle speed from the vehicle speed sensor 20 to the predetermined value. If not, the methodology advances to block 38 previously described. If so, the methodology advances to diamond 46 and determines whether this diagnostic setup portion has been performed before, for example, by looking for a flag. If so, the methodology advances to block 38 previously described. If not, the methodology advances to diamond 48 and determines whether the P/N switch 26 fault is already set or indicated, for example, by looking for a fault flag. If so, the methodology advances to block 38 previously described. If not, the methodology advances to diamond 50 and determines whether the P/N switch 26 indicates a Drive state, for example, by looking for a flag. If not, the methodology advances to block 52 and increments a P/N valid-state counter (not shown) of the engine controller 12 by a predetermined value such as one (1). The use of the P/N valid-state counter insures that switch bounces are filtered out and only stable P/N states are counted toward passing the diagnostics. It should be appreciated that the P/N valid-state counter is incremented by one (1) every time the P/N switch 26 indicates Park/Neutral since that is the expected state.

After block 52 or if the P/N switch 26 does indicate a Drive state in diamond 50, the methodology advances to diamond 54 and determines whether the engine cranking period is over, for example, by looking at the count on the EPP counter. In order to identify the cranking state, the EPP counter is incremented at certain crank edge interrupts such as every (69°) sixty-nine degrees from its initial zero (0) value at key-on for start of the engine. The engine controller 12 looks at the count on the EPP counter to see if it has reached twenty (20) EPP counts. If not, the methodology advances to block 38 previously described. If so, the methodology advances to block 56 and sets a P/N Diagnostic Done flag to indicate that the cranking period is over. The methodology then advances to block 38 previously described. It should be appreciated that the setting of the P/N Diagnostic Done flag will inhibit further execution of the diagnostic setup portion for the P/N switch 26.

Referring to FIG. 3, a flowchart of the methodology of an evaluation portion for in Park diagnostics of the methodology of diagnosing the P/N switch 26 is shown. This methodology evaluates and examines the P/N valid-state counter. The methodology begins in bubble 60 and advances to diamond 62. In diamond 62, the methodology determines whether the P/N diagnostic setup portion, according to FIG. 2, has been done, for example, by looking for the P/N Diagnostic Done flag. If not, the methodology advances to bubble 64 and returns. If so, the methodology advances to diamond 66 and determines whether the P/N valid-state counter is at a predetermined pass threshold such as, for example, ten (10) counts. If so, the methodology concludes that the test has passed and that the P/N switch 26 passes the in Park diagnostics. The methodology then advances to bubble 64 previously described.

In diamond 66, if the P/N valid state counter is not at or above the predetermined pass threshold, the methodology advances to block 68 and matures the fault by setting a fault code that is associated with the P/N switch 26. The methodology then advances to block 70 and sets the fault flag. The setting of the fault flag will force the malfunction indicator lamp 32 to turn ON. The methodology then advances to block 72 and clears the P/N valid-state counter for future testing. The methodology then advances to bubble 64 and returns.

Referring to FIG. 4, a flowchart of the methodology for in Drive diagnostics of the methodology of diagnosing the P/N switch 26 is shown. The methodology examines the state of the P/N switch 26 under certain control conditions to make sure that the P/N switch 26 indicates the Drive state of the automatic transmission correctly. The methodology begins in bubble 80 and advances to diamond 82. In diamond 82, the methodology determines whether the vehicle is equipped with an automatic transmission, for example, by looking for a flag. If not, the methodology advances to bubble 84 and returns. If so, the methodology advances to diamond 86 and determines whether the vehicle speed is above a predetermined threshold such as fifty (50) mph. The engine controller 12 compares the vehicle speed from the vehicle speed sensor 20 to the predetermined threshold. If not, the methodology advances to block 88 and resets the previously described counters for future testing.

In diamond 86, if the vehicle speed is above the predetermined threshold, the methodology advances to diamond 90 and determines whether the engine speed is within a specified range such as 1900 to 4400 r.p.m. The engine controller 12 compares the engine speed from the crank sensor 18 to the low and high values of the specified range. If not, the methodology advances to block 88 previously described. If so, the methodology advances to diamond 92 and determines whether the throttle position is above a predetermined threshold represented as a voltage such as 0.49 volts. If not, the methodology advances to block 88 previously described.

In diamond 92, if the throttle position is above the predetermined threshold, the methodology advances to block 94 and calculates a percent of barometric pressure (%Baro) such as sixty-six percent (66%). The methodology then advances to diamond 96 and determines whether MAP is above the %Baro. The engine controller 12 compares MAP from the MAP sensor 24 to the %Baro. If not, the methodology advances to block 88 previously described. If so, the methodology advances to diamond 98 and determines whether the P/N switch 26 has already set a fault. If so, the methodology advances to bubble 100 and returns.

In diamond 98, if the P/N switch 26 has not already set a fault indicated by a fault flag, the methodology advances to diamond 102 and determines whether the P/N switch 26 indicates a Drive mode or state for example, by looking for a flag. If so, the methodology concludes that the P/N switch 26 has passed the test and advances to block 88 previously described. If not, the methodology advances to block 104 and increments a test-failed counter (not shown) of the engine controller 12 by a predetermined value such as one (1). The test-failed counter is used to filter out the effect of switch bounces. The methodology then advances to diamond 106 and determines whether the test-failed counter is at a predetermined fail threshold such as fourteen (14) counts. If not, the methodology advances to bubble 108 and returns. If so, the methodology advances to block 110 and matures the fault to set a fault code that is associated with the P/N switch 26. The methodology then advances to block 112 and sets the fault flag. The setting of the fault flag will force the malfunction indicator lamp 32 to turn ON. The methodology then advances to block 88 previously described.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of diagnosing a Park/Neutral (P/N) switch for sensing a P/N state and a Drive state of an automatic transmission in an automotive vehicle powered by an engine having a defined cranking period, said method comprising the steps of:
   determining whether the engine of the automotive vehicle is cranking;
   diagnosing the P/N switch for the P/N state of the automatic transmission when the engine is cranking; and
   diagnosing the P/N switch for the Drive state of the automatic transmission when the engine is not cranking.

2. A method as set forth in claim 1 wherein said step of determining whether the engine of the automotive vehicle is cranking comprises determining whether the engine is past cranking by looking for a flag.

3. A method as set forth in claim 1 wherein said step of diagnosing the P/N switch for the P/N state comprises:
   determining whether at least one predetermined condition exists;
   ending the method when the predetermined condition does not exist; and
   determining whether the P/N switch indicates the Drive state when the predetermined condition exists.

4. A method as set forth in claim 3 including the steps of:
   incrementing a P/N valid-state counter if the P/N switch does not indicate the Drive state;
   determining whether either one of the cranking period for the engine is over after said step of incrementing and if the P/N switch does indicate the Drive state;
   setting a P/N Diagnostic Done flag if the cranking period is over; and
   ending the method after either one of said step of setting and if the cranking period is not over.

5. A method as set forth in claim 4 including the steps of:
   determining whether the P/N diagnostics have been set up by looking for the P/N Diagnostic Done flag;
   determining whether the P/N valid-state counter is at least as great as a predetermined threshold if the diagnostics have been set up; and
   ending the method if either one of the P/N diagnostics have not been setup and the P/N valid-state counter is at least as great as the predetermined threshold.

6. A method as set forth in claim 5 including the steps of:
   maturing a fault if the P/N valid state counter is not at least as great as the predetermined threshold;
   setting a predetermined flag; and
   clearing the P/N valid-state counter.

7. A method as set forth in claim 3 wherein said step of determining whether at least one predetermined condition exists includes determining whether the vehicle is equipped with an automatic transmission.

8. A method as set forth in claim 3 wherein said step of determining whether at least one predetermined condition exists includes determining whether a speed of the vehicle is equal to a predetermined value.

9. A method as set forth in claim 3 wherein said step of determining whether at least one predetermined condition exists includes determining whether this diagnostic has been performed before.

10. A method as set forth in claim 1 wherein said step of diagnosing the P/N switch for the Drive state comprises:
    determining whether a plurality of predetermined conditions exist;
    determining whether the P/N switch indicates the Drive state if the predetermined conditions exist; and
    resetting at least one predetermined counter if either one of the predetermined conditions do not exist and the P/N switch indicates the Drive state.

11. A method as set forth in claim 10 including the steps of:
    incrementing a test-failed counter if the P/N switch does not indicate the Drive state;
    determining whether the test-failed counter is at least as great as a predetermined threshold;
    maturing a fault if the test-failed counter is at least as great as the predetermined threshold;
    setting a predetermined flag indicating the fault has matured; and
    resetting at least one predetermined counter once the fault has matured.

12. A method as set forth in claim 10 wherein said step of determining the predetermined conditions includes determining whether the vehicle is equipped with an automatic transmission.

13. A method as set forth in claim 10 wherein said step of determining the predetermined conditions includes determining whether a speed of the vehicle is equal to a predetermined value.

14. A method as set forth in claim 10 wherein said step of determining the predetermined conditions includes determining whether a speed of the engine is within a predetermined range.

15. A method as set forth in claim 10 wherein said step of determining the predetermined conditions includes determining whether a throttle of the engine is above a predetermined threshold.

16. A method as set forth in claim 10 wherein said step of determining the predetermined conditions includes calculating a percent of barometric pressure (%Baro) and determining whether MAP is greater than %Baro.

17. A method of diagnosing a Park/Neutral (P/N) switch for sensing a P/N state and a Drive state of an automatic transmission in an automotive vehicle powered by an engine having a defined cranking period, said method comprising the steps of:
    determining whether an engine of the automotive vehicle is cranking;
    determining whether at least one predetermined condition exists while the engine is cranking;
    determining whether the P/N switch indicates the Drive state if the predetermined condition exists;
    incrementing a P/N valid-state counter if the P/N switch does not indicate the Drive state;
    determining whether the cranking period for the engine is over after said step of incrementing;
    determining whether the cranking period for the engine is over when the P/N switch does indicate the Drive state;
    setting a P/N Diagnostic Done flag if the cranking period is over;
    determining whether the P/N diagnostics have been set up;
    determining whether the P/N valid-state counter is at least as great as a predetermined threshold if the P/N diagnostics have been set up;
    ending the method if the P/N diagnostics have not been setup;
    ending the method if the P/N valid-state counter is at least as great as the predetermined threshold;
    maturing a fault if the P/N valid state counter is not at least as great as the predetermined threshold;
    setting a predetermined flag indicating the fault has matured; and
    clearing the P/N valid-state counter once the fault has matured.

18. A method of diagnosing a Park/Neutral (P/N) switch for sensing a P/N state and a Drive state of an automatic transmission inn an automotive vehicle powered by an engine, said method comprising the steps of:
    determining whether at least one predetermined condition exists;
    determining whether the P/N switch indicates the Drive state if the predetermined condition exists;
    resetting at least one predetermined counter if the predetermined condition does not exist;
    resetting at least one predetermined counter when the P/N switch indicates the Drive state;
    incrementing a test-failed counter if the P/N switch does not indicate the Drive state;
    determining whether the test-failed counter is at least as great as a predetermined threshold;
    maturing a fault if the test-failed counter is at least as great as the predetermined threshold;
    setting a predetermined flag indicating the fault has matured; and
    resetting predetermined counters once the fault has matured.

* * * * *